United States Patent
Krall et al.

(10) Patent No.: US 7,954,425 B2
(45) Date of Patent: Jun. 7, 2011

(54) GRATING DISK FOR FOOD PROCESSOR

(75) Inventors: Hans Krall, Eberstein (AT); Thomas Sigot, Klagenfurt (AT); Leander Bukoschek, Klagenfurt (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 454 days.

(21) Appl. No.: 11/816,758

(22) PCT Filed: Feb. 14, 2006

(86) PCT No.: PCT/IB2006/050478
§ 371 (c)(1), (2), (4) Date: Aug. 21, 2007

(87) PCT Pub. No.: WO2006/087674
PCT Pub. Date: Aug. 24, 2006

(65) Prior Publication Data
US 2008/0202355 A1 Aug. 28, 2008

(30) Foreign Application Priority Data
Feb. 21, 2005 (EP) .................................. 05101297

(51) Int. Cl.
*B04B 5/10* (2006.01)
*B02C 19/00* (2006.01)
(52) U.S. Cl. ........................ 99/513; 241/292.1
(58) Field of Classification Search ............ 99/501–513; 241/101.01, 282.1, 282.2, 292.1
See application file for complete search history.

(56) References Cited

U.S. PATENT DOCUMENTS

| 2,971,220 A | 2/1961 | Henzirohs | |
|---|---|---|---|
| 2,971,550 A | 2/1961 | Henzirohs | |
| 2,971,649 A | 2/1961 | Henzirohs | |
| 4,256,265 A | 3/1981 | Madan | |
| 4,345,517 A | 8/1982 | Arao | |
| 6,742,447 B1 * | 6/2004 | Chen | 99/510 |
| 6,862,981 B1 * | 3/2005 | Yen | 99/492 |
| 7,080,594 B2 * | 7/2006 | Lin | 99/511 |
| 2006/0000327 A1 * | 1/2006 | Lin | 83/355 |

FOREIGN PATENT DOCUMENTS

| DE | 202006019868 U1 | 6/2007 |
|---|---|---|
| EP | 0025943 A1 | 4/1981 |
| GB | 852220 | 10/1960 |
| JP | 01299522 A | 4/1989 |
| JP | 04244119 A | 9/1992 |

* cited by examiner

*Primary Examiner* — Sang Y Paik
(74) *Attorney, Agent, or Firm* — Sherry Womack

(57) ABSTRACT

To improve the efficiency of juice-extracting food processors (1) based on grating fruit or vegetables, wherein the inlet piece (2) forms an interstice (I) with the grating disk (3), interstitial cutting teeth (302) are arranged in the interstice (I). Pieces of fruit or vegetables in the interstice (I) are additionally accelerated in the direction of the sieve 151 due to centrifugal forces by the interstitial cutting teeth (302) acting on these pieces. The juice contained in these pieces is thus more efficiently extracted. For better processing of pieces of fruit or vegetables with a high juice content, the interstitial cutting teeth (302) are preferably higher than the other cutting teeth (301) of the grating disk (3).

6 Claims, 4 Drawing Sheets

GRATING DISK FOR FOOD PROCESSOR

The invention relates to a grating disk for a food processor, particularly to a juice extractor and its grating disk.

Food processors are normally used for various tasks such as juicing, mixing, cutting, grating, grinding, milling, etc. They may be multifunctional or optimized for one or more special tasks so as to operate, for example, as a juice extractor, a mixer, etc.

In most cases, the food processors have an inlet piece to feed the food to be processed downwardly onto a rotating element, such as a blade, a grating disk or the like. This rotating element may be driven by a motor accommodated in the housing of the food processor.

A rotating horizontal disk having cutting teeth is normally used for grating food or extracting juice, especially from fruit and vegetables. For grating food, the inlet piece has a diameter which is much smaller than the grating disk and opens onto a recipient having the grating disk as its bottom and having an inner diameter which is larger than that of the grating disk. In some cases, the recipient has a lid and the opening of the recipient is the inlet piece. The food to be grated falls onto the rotating grating disk and is thrown against the sidewalls of the recipient due to centrifugal forces acting from the cutting teeth on the food. The friction between the food and the side walls of the recipient leads to a rotation of the food around its own axis simultaneously with the rotation along with the rotating grating disk, but in the opposite direction. This speeds up the grating process.

Such a grating food processor is described in JP 04-244119 A. The food to be grated, for example, radish, is introduced into the recipient by opening its lid and falls onto the grating disk. The grated bits fall through small openings behind each cutting tooth into a receptacle under the grating disk. In particular with food having a diameter which is larger than the radius of the grating disk, such as with radish, the problem arises that the part of the radish that protrudes over the center of the grating disk has the cutting teeth acting on it in such a way that its rotational movement around its own axis is slowed down, thus slowing down the grating process.

In order to reduce the negative impact on pieces of food which are larger than the radius of the grating disk, JP 04-244119 A discloses a food processor with a grating disk having a center part with cutting teeth that have a smaller height than the cutting teeth of the main part of the grating disk. Such a grating disk ensures that the cutting teeth acting on the part of e.g. the radish that protrudes over the center of the grating disk do not excessively slow down the rotation of the radish around its own axis. At the same time, it is ensured that grating still occurs in the center part of the grating disk. As a result, even larger pieces of food are grated uniformly and in a short time.

The situation is different in food processors used for extracting juice. Juice extractors using a grating disk extract juice from e.g. a fruit or a vegetable by pressing it onto the rotating grating disk, which grates material from the surface of the fruit or vegetable while at the same time releasing the juice. The grated material and the juice are thrown upwardly and outwardly by centrifugal forces against the surface of a filter surrounding the grating disk. In most cases, the filter has a frusto-conical shape. The pulp carries on over the edge of the filter and is collected in a suitable receptacle. The finely filtered juice passes through the filter into another receptacle.

In general, juice extractors have an inlet piece opening out just over the grating disk and having a diameter which is smaller than that of the grating disk in order to ensure that the food to be processed is held against the rotation with the grating disk. The grating disk and the inlet piece form an interstice through which the pulp and the juice pass before they are thrown against the sloping surface of the filter. In order to make good use of the surface of the grating disk, the diameter of the inlet piece is generally only slightly smaller than that of the grating disk. The interstice is thus formed in the region between the outermost cutting teeth and the edge of the grating disk.

It is an object of the invention to further improve the efficiency of food processors or juice extractors used for extracting juice with the aid of a rotating grating disk.

In a first aspect of the invention, a grating disk is provided for a food processor having an inlet piece, the grating disk having cutting teeth for grating food to be processed and being rotatably placed at the inner opening of the inlet piece with an interstice between it and the inlet piece, and its diameter being larger than the diameter of the inlet piece, wherein said grating disk additionally comprises one or more interstitial cutting teeth to be positioned in said interstice.

In a further aspect of the invention, a food processor, particularly for extracting juice, comprising such a grating disk is provided.

By providing interstitial cutting teeth, the efficiency of the juice-extracting process is enhanced in that e.g. the fruits or vegetables are additionally crushed and comminuted between the interstitial cutting teeth and the inner opening of the inlet piece. Furthermore, the bits and pieces of e.g. the fruits or vegetables are additionally accelerated centrifugally against the sieve, thus ensuring that a maximum quantity of juice is extracted by having the bits and pieces impinge upon the sieve at a higher velocity, and ensuring that all solid parts are ejected outside the sieve and do not obstruct it. A further advantage is that a larger filtering area of the sieve is utilized, because the trajectories of the solid parts are distributed through a larger angle. In conventional arrangements, the angle is limited by the width of the whole interstice. In the arrangement according to the invention, with interstitial cutting teeth, the angle is only limited, if at all, by the width between the outermost interstitial cutting teeth and the outermost edge of the inner opening of the inlet piece.

In preferred embodiments, the one or more interstitial cutting teeth have a larger height than cutting teeth which are not positioned in the interstice. In further preferred embodiments, the one or more interstitial cutting teeth as well as one or more cutting teeth positioned proximate to the interstice have a larger height than cutting teeth positioned at a distance from the interstice. It has been shown that, compared with more solid food, such as e.g. carrots or apples, very juicy food, such as e.g. melons, pineapples or grapes, is more efficiently processed by higher cutting teeth, i.e. the juice output is higher when using higher cutting teeth.

The cutting teeth with a larger height are preferably positioned on the inner region of the grating disk with respect to the interstice. The grating effect is increased if the food to be processed is held by the inner wall while being grated.

The interstitial cutting teeth or the interstitial and the higher cutting teeth are preferably positioned on the outer periphery of the grating disk so as to use the area of the grating disk to a maximal extent.

Advantageously, the interstitial cutting teeth or the interstitial and the higher cutting teeth are positioned on an area shaped as a ring which is coaxial with the grating disk. This ensures that the cutting teeth in question are homogeneously distributed. Consequently, the process of grating, cutting, comminuting and crushing the food to be processed is performed homogeneously throughout the circumference of the grating disk, thus reducing the risks of unbalance due to pieces less processed and of blocking the rotation.

In preferred embodiments, the interstitial cutting teeth or the interstitial and higher cutting teeth have a higher density than non-interstitial cutting teeth or non-interstitial and lower cutting teeth, thus further enhancing the efficiency of the juice-extracting process at the interstice.

These and other aspects of the invention are apparent from and will be elucidated with reference to the embodiments described hereinafter.

Figure 1:
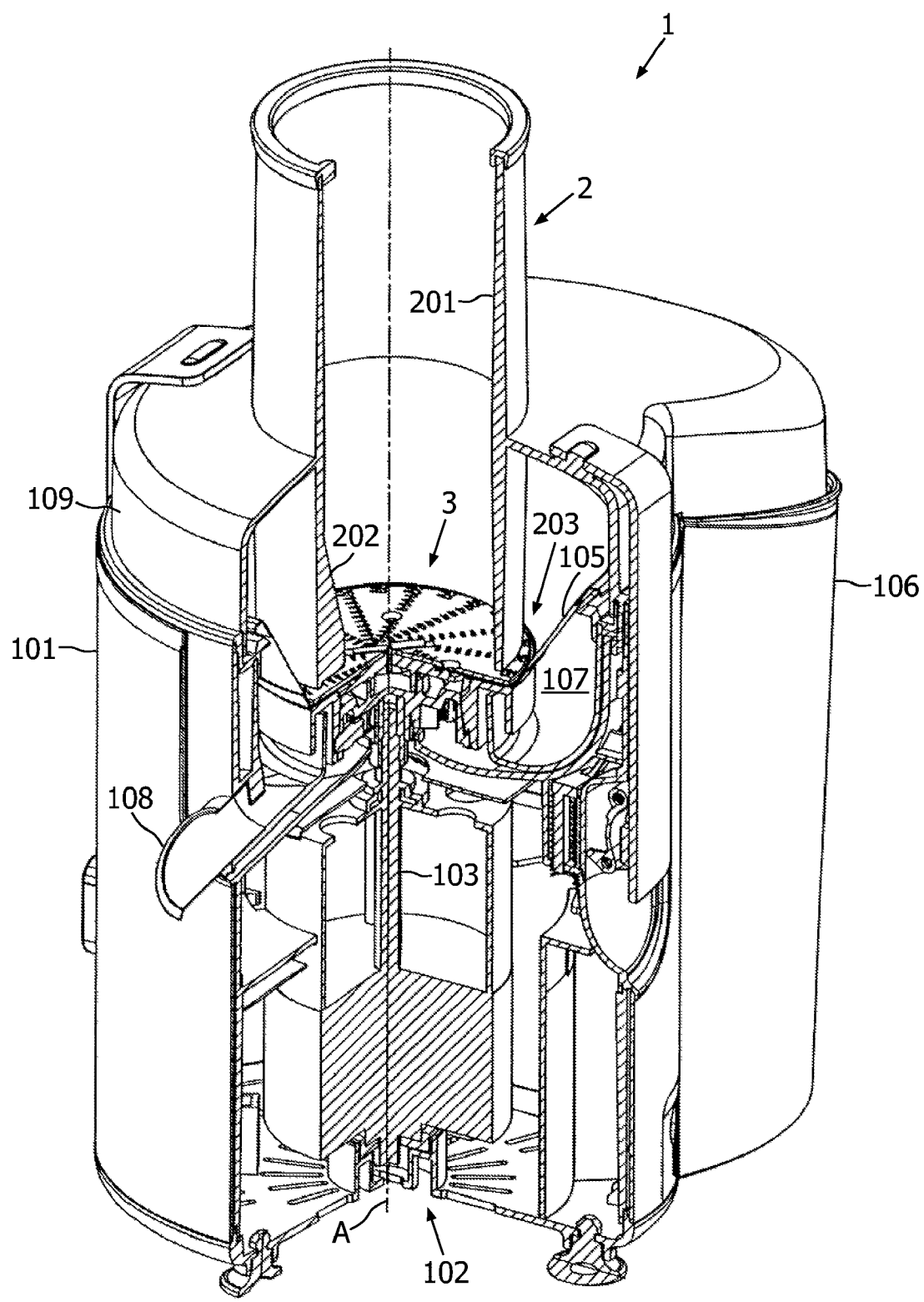
FIG. 1 shows a juice extractor according to the invention in a partially cut view.

FIG. 1 shows a juice extractor 1 according to the invention in a partially cut view. A housing 101 accommodates a motor 102 with a driving shaft 103. They drive a grating disk 3 arranged on the driving shaft 103 to a rotational movement around axis A. The grating disk 3 is arranged in the middle of a filter sieve 105, which is surrounded by a juice receptacle 107. The rotating grating disk 3 grates vegetables and/or fruit, and the juice and pulp are thrown against the filter sieve 105. The juice drips through the filter sieve 105 and is collected by the juice receptacle 107, from which it is drained via a spout 108, for example, into a glass positioned under the juice spout 108. The pulp is ejected over the upper edge of the filter sieve 105 and is collected in a pulp container 106.

The housing 101 with motor 102, driving shaft 103, grating disk 3, filter sieve 105, juice receptacle 107 and pulp container 106 is covered by a lid 109. The lid 109 has an inlet piece 2 for feeding fruit, vegetables, etc. into the juice extractor 1, i.e. putting them on the grating disk 3. In the example illustrated in FIG. 1, the inlet piece 2 has the form of a feeding tube, the inner opening 203 of which is positioned just over the grating disk 3 in order to form an interstice with the grating disk 3. The inlet piece 2 is dimensioned in such a way that it has a slightly smaller inner radius than the grating disk 3.

When fruit or vegetables are introduced into the juice extractor 1 via the inlet piece 2, for example, by means of a pusher to be introduced into the inlet piece 2 for pushing the fruit or vegetables and to be guided by the protrusion 202, the fruit or vegetable is held by the pusher and the side wall 201 of the inlet piece 2 so as to be grated into bits and pieces by the grating disk 3. The bits and pieces are then caused to pass through the interstice by centrifugal forces.

In other embodiments, the inlet piece 2 does not need to be a feeding tube. It may also be formed merely by the side walls which are the boundaries of the inner volume and have the grating disk 3 as their bottom. If the fruit or vegetable to be processed were introduced into this inner volume, they would be thrown against the side walls where they would get grated, with the pulp and juice passing through the interstice between the side walls and the grating disk to be filtered by the sieve.

As will also be seen in more detail in the following Figures, the grating disk 3 does not only have cutting teeth distributed on the middle part of its surface, but also interstitial cutting teeth positioned in the interstice between the inlet piece and the grating disk. Interstitial cutting teeth enhance the efficiency of the juice-extracting process in that the fruits or vegetables are additionally crushed and comminuted in the interstice. Furthermore, the resulting bits and pieces are additionally accelerated centrifugally against the filter sieve 105, thus ensuring that a maximum quantity of juice is extracted by having the bits and pieces impinge upon the filter sieve 105 at a higher velocity, and that all solid parts are ejected outside the filter sieve 105 for collection in the pulp container 106 and thus do not obstruct the filter sieve 105.

Figure 2:
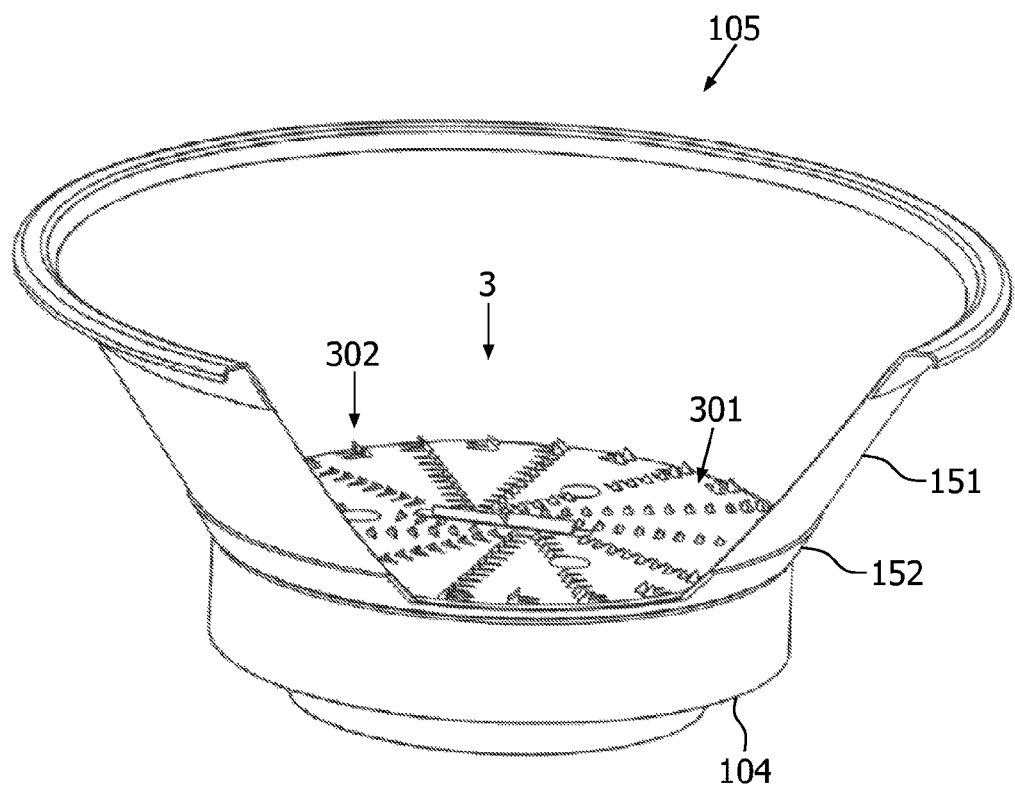
FIG. 2 shows a grating disk according to the invention with a filter sieve.

The filter sieve 105 is shown in greater detail in FIG. 2. The filter sieve 105 has a frusto-conical shape and consists basically of the sieve 151 and the sieve support 152. The grating disk with conventional cutting teeth 301 and interstitial cutting teeth 302 is arranged in the center of the filter sieve 105. Both grating disk 3 and filter sieve 105 are supported by the holder 104. The holder 104 is arranged in the juice extractor 1 on the driving shaft 103 so that either only the grating disk 3 is rotated or both grating disk 3 and filter sieve 105 are rotated. In the latter case, the pulp is more efficiently ejected into the pulp container 106, but the motor 102 must have more power.

Figure 3:
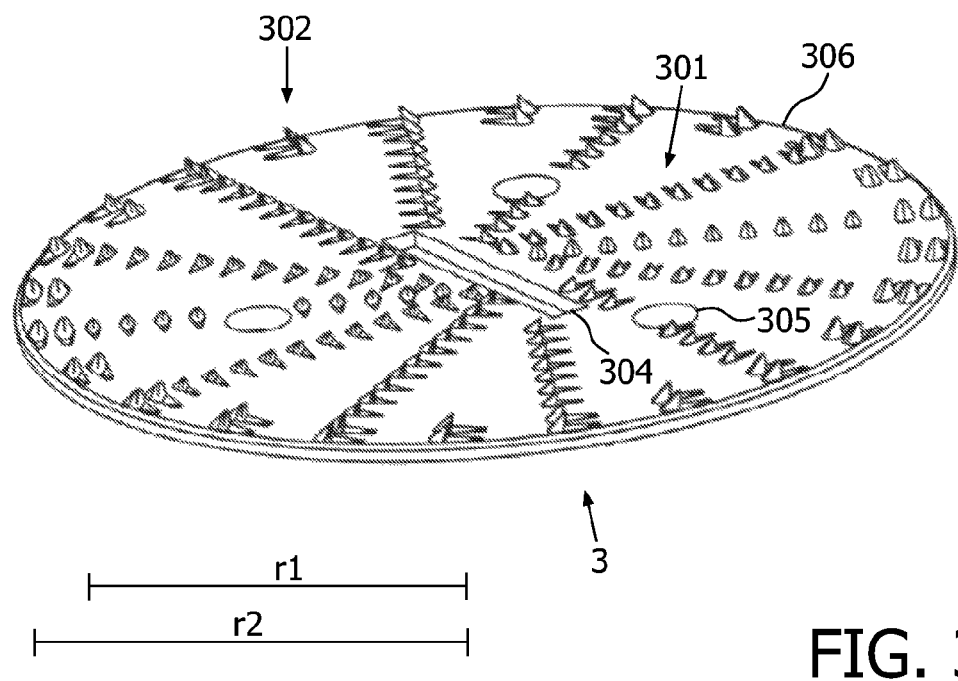
FIG. 3 shows a grating disk according to the invention.

FIG. 3 shows a grating disk 3 according to the invention in greater detail. It has a slit 304 for fixing it on the driving shaft 103 and finger holes 305 to grip it for positioning and removal. Conventional cutting teeth 301 are arranged in lines starting from the middle of the grating disk 3 and flare out like rays. These cutting teeth 301 are used for grating fruit or vegetables after feeding them into the juice extractor 1. Interstitial cutting teeth 302 are positioned on the outer periphery 306 of the grating disk 3 in an area shaped as a ring which is coaxial with the grating disk 3. This ensures a homogeneous distribution of the cutting teeth 302 as well as a maximal utilization of the area of the grating disk 3. The process of grating, cutting, comminuting and crushing the fruit or vegetable is performed homogeneously throughout the circumference and area of the grating disk, thus reducing the risks of unbalance due to pieces less processed and of blocking the rotational movement.

The efficiency of juice extraction is further improved in that the interstitial cutting teeth 302 on the area $\pi(r2^2-r1^2)$ have a larger density than the conventional cutting teeth 301 on the respective area $\pi r1^2$.

Figure 4:
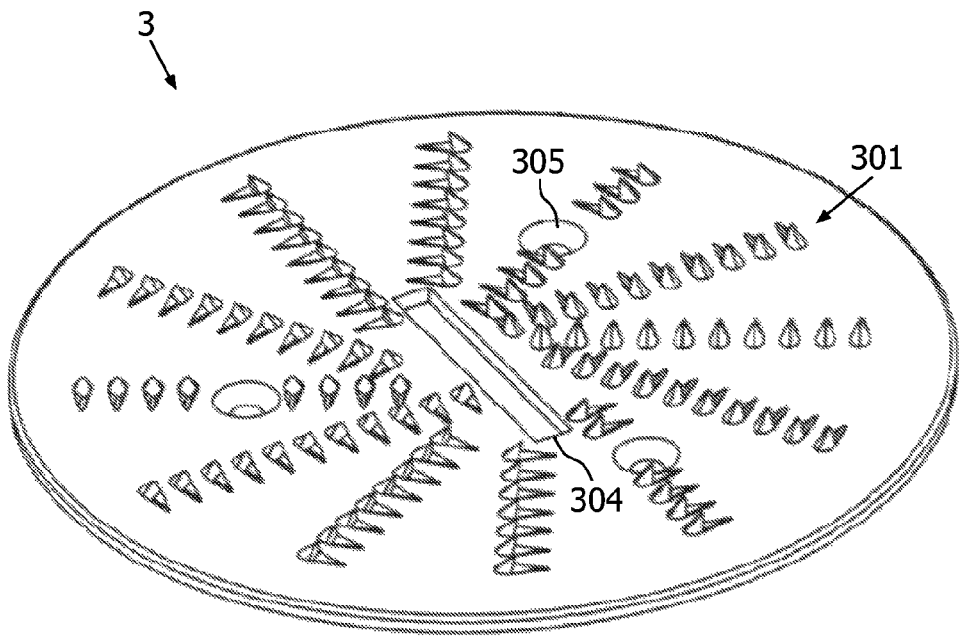
FIG. 4 shows a grating disk according to the prior art.

The grating disk 3 according to the invention, shown in FIG. 3, may be compared with a grating disk 3 according to the prior art as shown in FIG. 4. It also has a slit 304 and finger holes 305. However, instead of having both conventional cutting teeth 301 and interstitial cutting teeth 302, it has only cutting teeth 301 which are arranged in lines starting from the middle of the grating disk 3 and flare out like rays.

Figure 5:
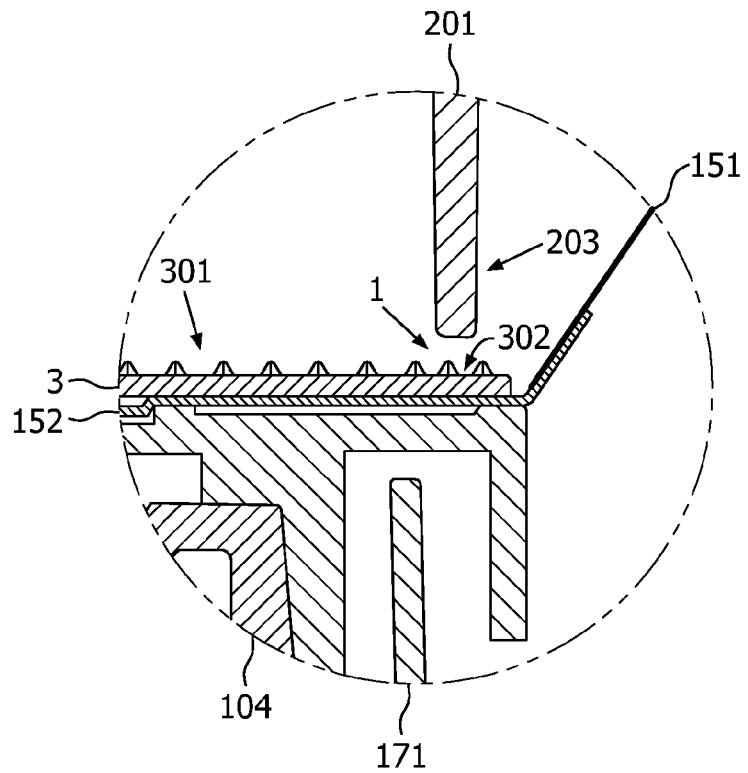
FIG. 5 shows a larger detail of the juice extractor of FIG. 1 with a first embodiment of the grating disk according to the invention.

FIG. 5 shows a larger detail of a juice extractor 1 illustrating the interstice I between the inner opening 203 of the inlet piece 2 and the grating disk 3. The holder 104 supports the grating disk 3 as well as the filter sieve 105 with sieve 151 and sieve support 152 and overhangs the side wall 171 of the juice receptacle so as to prevent juice entering the driving region of the juice extractor 1 with motor 102 and driving shaft 103. The grating disk 3 does not only have conventional cutting teeth 301 but also interstitial cutting teeth 302 positioned in the interstice I between the sidewall 201 of the inlet piece and the grating disk 3.

As can be seen in FIG. 5, a further advantage in addition to those mentioned above is that a larger filtering area of the sieve 105 is used, because the trajectories of the solid parts are distributed through a larger angle. In conventional arrangements, the angle is limited by the width of the whole interstice. In the arrangement according to the invention with interstitial cutting teeth, the angle is only limited, if at all, by the width between the outermost interstitial cutting teeth and the outermost edge of the inner opening of the inlet piece.

Figure 6:
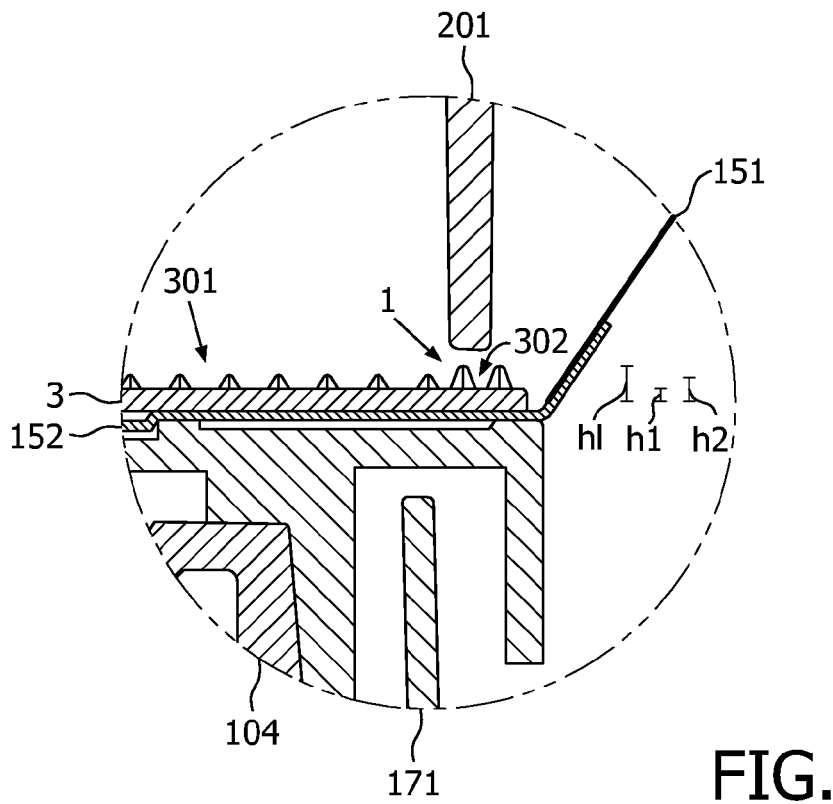
FIG. 6 shows a larger detail of the juice extractor of FIG. 1 with a second embodiment of the grating disk according to the invention.

FIG. 6 shows an equivalent larger detail of the interstice I, but with another preferred embodiment of the grating disk 3. As compared with the conventional cutting teeth 301 having a height h1, the interstitial cutting teeth 302 have a larger height h2. This is useful in that very juicy vegetables or fruit, such as e.g. melons, pineapples or grapes are more efficiently processed by higher cutting teeth, i.e. the juice output is higher when using higher cutting teeth. More solid fruits and vegetables, such as e.g. carrots or apples, are quite efficiently processed by smaller cutting teeth. Depending on the height of various cutting teeth, the juice extractor or food processor is optimized for solid food, for juicy food or for both. As compared with the height hI of the interstice I, the various heights hI, h1, h2 should be adjusted to allow passing of the bits and pieces of fruit or vegetable through the interstice I without grinding. The height hI of the interstice I should not be too large so as to prevent too large pieces from passing and to have their juice efficiently extracted by being thrown against the sieve 151.

Figure 7:
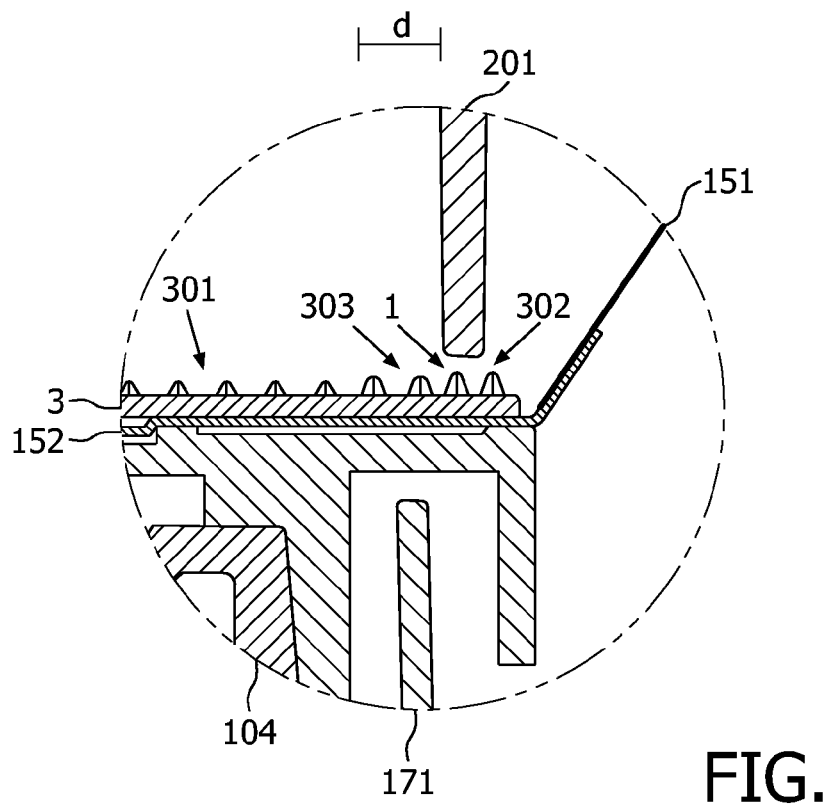
FIG. 7 shows a larger detail of the juice extractor of FIG. 1 with a third embodiment of the grating disk according to the invention.

FIG. 7 shows the enlargement of the interstice I with a further preferred embodiment of the grating disk 3. Not only are the interstitial cutting teeth 302 higher than the conventional cutting teeth 301, but also the cutting teeth 303 arranged in a region extending through a distance d from the side wall 201 of the inlet piece 2, i.e. from the interstice I, to the middle of the grating disk 3. The grating effect is thus increased especially for juicy fruits or vegetables, as they are held by the inner wall while being grated, and a large quantity of juice is extracted even before passing the interstice I.

Although several preferred embodiments of the invention have been described, it will be evident to those skilled in the art that various changes, alterations and substitutions can be made without departing from the spirit and scope of the invention. The invention is therefore claimed in any of its forms or modifications within the proper scope of the appended claims. For example, various combinations of the features of the dependent claims can be made with the features of the independent claim without departing from the scope of the invention. Furthermore, any reference numerals in the claims shall not be construed as limiting their scope.

LIST OF REFERENCE NUMERALS 1 juice extractor
101 housing
102 motor
103 driving shaft
104 holder
105 filter sieve
106 pulp container
107 juice receptacle
108 juice spout
109 lid
151 sieve
152 sieve support
171 sidewall
2 inlet piece
201 side wall
202 protrusion
203 inner opening
3 grating disk
301 cutting teeth
302 interstitial cutting teeth
303 higher cutting teeth
304 slit
305 hole
306 outer periphery
A axis
I interstice
r1 radius
r2 radius
h1 height
h2 height
hI height
d distance

The invention claimed is:

1. A grating disk for a food processor having an inlet piece, the grating disk having cutting teeth for grating food to be processed and being rotatably placed at an inner opening of the inlet piece with an interstice between the grating disk and the inlet piece, and a diameter of the grating disk being larger than a diameter of the inlet piece, wherein the grating disk additionally comprises one or more interstitial cutting teeth positioned in the interstice, wherein an uppermost portion of the interstitial cutting teeth is lower than a lowermost portion of the inlet piece, wherein the one or more interstitial cutting teeth as well as one or more cutting teeth positioned proximate to the interstice have a larger height than cutting teeth positioned at a distance from the interstice, and wherein the one or more interstitial cutting teeth have a larger height than cutting teeth which are not positioned in the interstice.

2. The grating disk according to claim 1, wherein the cutting teeth with a larger height are positioned on the inner region of the grating disk with respect to the interstice.

3. The grating disk according to claim 1, wherein the interstitial cutting teeth or both the interstitial teeth and higher cutting teeth are positioned on the outer periphery of the grating disk.

4. The grating disk according to claim 1, wherein the interstitial cutting teeth or both the interstitial teeth and higher cutting teeth are positioned on an area shaped as a ring which is coaxial with the grating disk.

5. The grating disk according to claim 1, wherein the interstitial cutting teeth or both the interstitial teeth and higher cutting teeth have a higher density than non-interstitial cutting teeth or non-interstitial and lower cutting teeth.

6. A food processor, particularly for extracting juice, comprising a grating disk according to claim 1.

* * * * *